Aug. 13, 1957 G. ELLIOTT ET AL 2,802,902

RINGING CONTROL CIRCUIT FOR TELEPHONE SYSTEMS

Filed Sept. 29, 1954 3 Sheets-Sheet 1

INVENTOR.
GEORGE ELLIOTT
FRANCIS E. BLAKE

BY

Francis E. Blake

ATTORNEY

RINGING CONTROL CIRCUIT FOR TELEPHONE SYSTEMS

Filed Sept. 29, 1954 3 Sheets-Sheet 2

INVENTOR.
GEORGE ELLIOTT
FRANCIS E. BLAKE
BY
Francis E. Blake
ATTORNEY

INVENTOR.
GEORGE ELLIOTT
FRANCIS E. BLAKE

BY Francis E. Blake
ATTORNEY

United States Patent Office 2,802,902

Patented Aug. 13, 1957

2,802,902

RINGING CONTROL CIRCUIT FOR TELEPHONE SYSTEMS

George Elliott, Rochester, and Francis E. Blake, Penfield, N. Y., assignors, by mesne assignments, to General Dynamics Corporation, a corporation of Delaware Application September 29, 1954, Serial No. 459,072

20 Claims. (Cl. 179—17)

This invention relates to dial telephone systems, and more particularly to the control of the application of ringing current to a party line of a dial telephone system.

Dial telephone systems providing party line operation are well known. In some of such systems, calls to a particular party on a party line are identified by a characteristic ringing signal such as a coded signal in which the identifying code may be the number of rings in quick succession in a ringing cycle. To avoid confusion, it is most desirable that a coded ringing system be as simple as possible and, for example, a code of one or two rings for characterizing two parties is obviously the most simple. Other party line systems having so-called divided ringing may distinguish between two parties on an ungrounded party line by applying ringing current between either one side or the other of the line and ground and in this arrangement the ringing apparatus for the substation equipment of each of the two parties on the line is connected between a respective different side of the line and ground. Yet another type of party line ringing system may distinguish between two parties on a line by superimposing a direct current of a selected polarity on the alternating ringing current and respective different party substations may be provided with respectively differently poled rectifier types of conducting devices in series with the ringer so that only the ringer having a conducting device poled to conduct ringing current with the particular polarity of the superimposed direct current will be rung. It will be noted that all of the different types of party line ringing systems referred to above use a single frequency of ringing current for all calls.

It is an object of the present invention to provide a party line telephone system with an improved and simplified arrangement for characterizing the ringing to different stations on the line.

The ringing control system of the invention is adapted for use with dial telephone connector circuits of either the so-called terminal per station type with which each different station on the party line terminates in different sets of connector switch terminals or the terminal per line type with which all substations terminate on the same set of connector switch terminal contacts. According to the invention, a common ringing generator supply and control circuit is used for either terminal per line or terminal per station connector service. A single ringing generator conductor is provided to extend from the ringing source to the connector circuit and the ringing generator is alternately and sequentially connected to the generator conductor in series with ground and a superimposed direct current source of alternating polarity. In addition, a marking lead for each different party substation extends from the ringing supply and control circuit to the connector circuit and controls the operation of relay means for connecting the ringing generator conductor to the party line only during the intervals that the superimposed direct current has a selected polarity characteristic of the desired party substation to be rung. Also according to the invention, the marking lead may be arranged to control the connection of the ringing generator to be connected and released once or twice during each period of the selected polarity of superimposed direct current thus providing a code of one or two rings. The above described circuit arrangements of the invention may also include a divided ringing arrangement. Thus the invention may provide characteristic ringing for a total of eight parties on a line with a single frequency of ringing current, a code of one and two rings, superimposed direct current of characteristic polarity, and divided ringing.

Further objects, features, and the attending advantages of the invention will be apparent with reference to the following specification and drawings in which.

Figure 1:
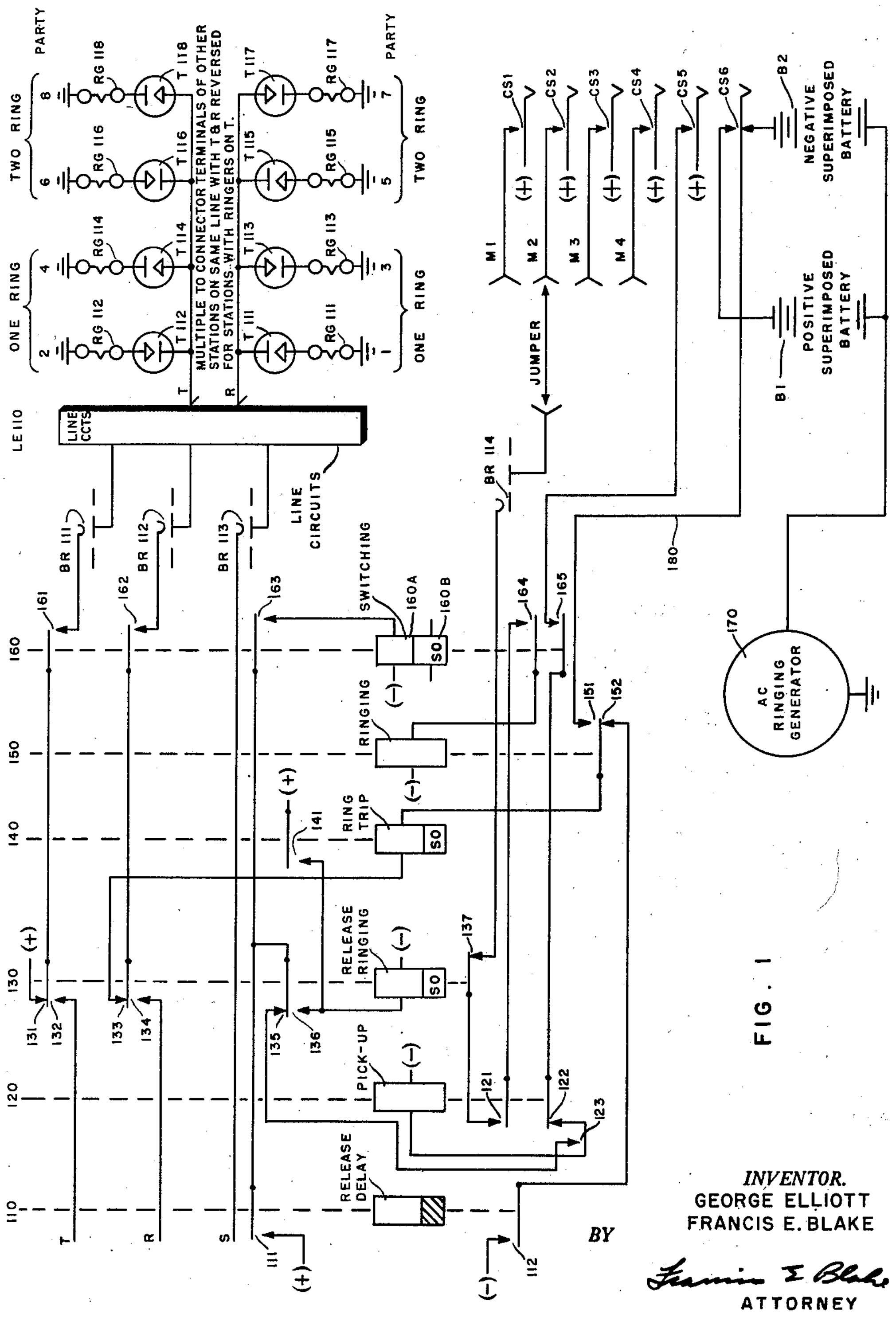
Fig. 1 is a partial schematic of a terminal per station party line connector and additionally shows the ringing generator conductor, marking leads, and ringing source as controlled by interrupter cam springs.

Referring to Fig. 1 of the drawings for a description of one form of the invention as arranged for terminal per station connector service, only the essential portions of such terminal per station connector circuit have been shown. The remainder of the connector circuit (not shown) is entirely conventional and any similar connector switch circuit known in the art may be utilized. The various party station ringers RG112, RG114, RG116, and RG118 are connected between one side of the party line and ground for party stations 2, 4, 6, and 8, respectively. It will be noted that respective rectifying devices T112, T114, T116, and T118 are interposed in the series connection for the respective ringers between the side of the line and ground, and rectifying devices T112 and T116 are poled to be conductive when the superimposed direct current for the ringing voltage is positive with respect to ground. Similarly, the rectifying devices T114 and T118 are poled to be conductive when the superimposed direct current of the ringing signal is negative with respect to ground. Ringers RG111, RG113, RG115, and RG117 are connected in series with rectifying devices T111, T113, T115, and T117 between the other side of the line and ground for party substations 1, 3, 5, and 7, respectively. It will be noted that rectifying devices T111 and T115 are poled similarly to rectifying devices T112 and T116 previously described, while rectifying devices T113 and T117 are poled similar to rectifying devices T114 and T118. Since the form of the invention now being described is adapted for terminal per station party line service, it will be understood that the party line to which the various ringers for stations 1–8 are connected is multiple connected to different sets of connector terminals to thereby provide the terminal per station operation. In order to reverse the side of the line on which the ringing current is conducted, the multiple connections for those party stations having ringers RG112, RG114, RG116, and RG118 connected to the T side of the party line are reversed at the connector terminals so that the ringing signal as applied to the connector brush BR112, in a manner to be described, will be actually connected through the connector terminals to the tip side of the party line.

On a call from a local party or an operator, the release delay relay 110 will be operated as is conventional, and the connector switch will be directively operated to idle line equipment LE110, and the switching relay 160 will operate through its winding 160B in a manner well known in the art. Relay 160, upon operating, will complete a holding circuit for itself from ground (+) through operated contacts 111, operated contacts 163 and through winding 160A to battery (—). As described in the foregoing paragraph, the line equipment LE110 includes connections whereby a plurality of different sets of connector terminals are connected in multiple to the party line to thus provide terminal per station party line operation, as is well known.

The operation of the switching relay 160 closes contacts 161 and 162 connecting to the connector brushes BR111 and BR112, respectively, for the tip and ring sides of the party line. A ring trip circuit is thus prepared extending from ground through normal contacts 131, operated contacts 161, brush BR111, the tip side of the party line, the ring side of the party line, brush BR112, operated contacts 162, normal contacts 133, operating coil of the ring trip relay 140, normal contacts 152, and operated contacts 112 of the release delay relay 110 to battery (—). When the call is answered, the loop circuit thus traced is completed to operate the ring trip relay 140 as will be later referred to in detail.

The operation of the switching relay 160 closes contacts 165 to prepare a circuit for operating the pickup relay 120 when the interrupter cam spring CS5 is momentarily closed to thereby connect ground through operated contacts 165, normal contacts 122, and coil of the pickup relay 120 to battery. By referring to Fig. 2 of the drawings it will be seen that pickup cam IC5 has a contour for briefly closing cam spring CS5 at the beginning of each six second ringing cycle. The operation of the pickup relay 120 is maintained by a holding circuit established through operated contacts 123 and normal contacts 135 to RD ground through the operated contacts 111 of the release delay relay 110. Thus, in such manner, the pickup relay 120 is first operated at the beginning of a ringing cycle and thereafter remains operated continuously until such time as the ringing is tripped to effectuate the operation of the release ringing relay 130, as will be later described.

The connector circuit of the form of the invention shown in Fig. 1 of the drawings is intended to be used with a connector switch having four brushes including the tip brush BR111, ring brush BR112, sleeve brush BR113, and hunt sleeve or extra control brush BR114. Each hunt sleeve or extra control terminal of the connector is connected by a respective jumper connection to a selected one of the marking leads M1, M2, M3, or M4 for characterizing the ringing to the particular party as identified by the set of connector terminals which has been directively selected by the connector switch operation. For example, assuming the jumper connection to be established through the M2 marking lead to interrupter cam spring CS2, a circuit is completed from ground when the interrupter cam spring CS2 is operated through the connector switch brush BR114, normal contacts 137, operated contacts 121 and 164 to the coil of the ringing relay 150 and battery. Thus the ringing relay 150 will be operated each time that the interrupter spring CS2 is operated by the cam IC2 having the profile shown in Fig. 2 of the drawing. If the jumper connection for the particular set of connector terminals corresponding to a different party substation were connected to the marking lead M1, the ringing relay 150 would be operated at the time that the interrupter cam spring CS1 is closed as determined by the cam profile IC1. Similarly, if the jumper were connected to the marking lead M3, the ringing relay 150 would be operated twice as shown by the cam profile IC3, while if the jumper were connected to the marking lead M4, the ringing relay 150 would be operated twice as shown by the cam profile IC4. Again referring to Fig. 2 of the drawings, it will be noted that a sixth cam IC6 is provided and that this cam profile will operate cam springs CS6 during the second half of the ringing cycle which is the portion of the ringing cycle during which time cam springs CS2 or CS4 would be operated. Similarly, cam springs CS1 and CS3 will be operated during the first half of the ringing cycle at a time when the cam spring CS6 is normal.

Figure 2:
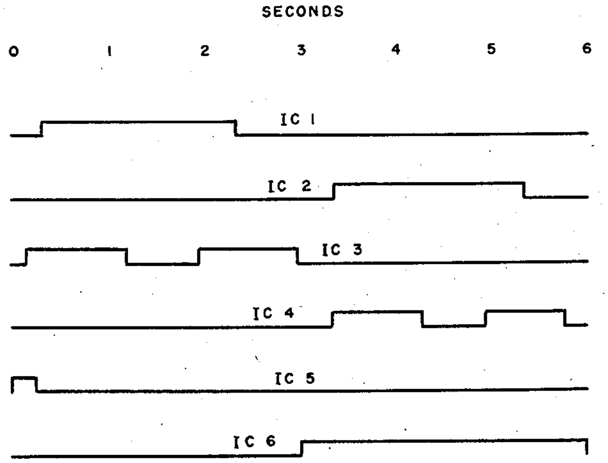
Fig. 2 is a timing chart showing cam profiles of interrupter cams controlling the interrupter cam springs.

Again referring to Fig. 1 of the drawings, it will be noted that when cam spring CS6 is in its normal position, the alternating current ringing generator 170 is connected in series with a negative superimposed battery B2 to a generator lead 180. The so-called negative superimposed battery is actually a source of direct current having its positive terminal connected through the alternating ringing generator 170 to ground and its negative terminal connected directly to the ringing generator lead 180. When the cam spring CS6 is operated, the A.-C. ringing generator 170 is connected in series with a so-called positive superimposed battery B1 through operated contacts CS6 to the ringing generator lead 180. Again referring to the timing chart of the interrupter cams as shown in Fig. 2 of the drawings, it will be seen that a ringing generator signal is always present in the ringing generator 180 and during the first half of each successive ringing cycle a negative superimposed battery B2 is connected and during the second half of the ringing cycle a positive superimposed battery B1 is connected. Instead of having two separate superimposed direct current sources such as batteries B1 and B2, a single battery may be used with suitable polarity reversing connections to the cam spring CS6 as will be apparent to anyone skilled in the art.

With further reference to the description of the invention and its operation, assuming the jumper from the extra control conductor terminal and brush BR114 to be connected to the M2 marking lead, the ringing relay 150 will be operated during the same time that the cam spring CS6 is operated to connect the ringing generator 170 and the positive superimposed battery B1 to the ringing generator conductor 180. The aforementioned operation of the ringing relay 150 connects the ringing generator conductor 180 through operated contacts 151 and the operating coil of the ring trip relay 140, through normal contacts 133, operated contacts 162, and brush BR112 to the party line circuit LE110. Thus ringers RG111 and RG115 will be rung, assuming these two ringers to be connected in series with positively poled rectifier devices T111 and T115 through the connector bank terminals to the ring side of the line. However, since spring CS2 for the marking lead M2 is operated only once during the second half of each ringing cycle, only the party at station 1 would answer since the code for station 5 requires two rings in a ringing cycle.

In the event that the jumper is connected to marking lead M1, which is energized when the cam spring CS1 is operated during the first half of the ringing cycle, the ringing relay 150 would be operated at a time when the cam spring CS6 is normal and the ringing generator 170 is therefore connected in series with the negative superimposed battery B2 to the ringing generator conductor 180. Therefore, ringers RG113 and RG117 would be rung once during each ringing cycle since their rectifying devices T113 and T117 are poled to conduct ringing current with a negative superimposed battery. As previously described, only party 3 would answer since party 7 requires a code of two rings. When the connector switch has been directively operated to one of the other four sets of terminals for the other four parties on the line, ringers RG112, RG114, RG116, and RG118 would be connected through their rectifying devices to the brush BR113 it being understood that the multiple connections at the connector terminals for these stations are reversed, as previously described.

When the jumper connection is connected to either marking terminal M3 or M4, two successive operations and releases of the ringing relay 150 will be effected during a first or second half of the ringing cycle respectively, at which time the superimposed battery is either positive or negative as has been previously described in connection with the operation of the ringing relay 150 by marking leads M1 or M2. Obviously, when two applications of ringing current in a ringing cycle are applied to the line, either stations 5 and 7, or 6 and 8, will answer depending upon the side of the line that is rung and the positive or negative superimposed battery as was previously described in connection with the application of a single spurt of ringing current for each ringing cycle.

When the party at the substation answers, the loop circuit over the line will be completed to cause the ring trip relay 140 to be operated by the previously traced direct current circuit through normal contacts 131, operated contacts 161, brush BR111, brush BR112, operated contacts 162, normal contacts 133, normal contacts 152 and operated contacts 112 to battery. An alternate circuit for operating the ring trip relay 140, during the ringing application, includes operated contacts 151 of the ringing relay 150, CS6 springs, through B1 or B2 and the A.-C. ringing generator to ground. Thus the ringing relay 140 operates on the direct current provided by B1 or B2 if the call is answered during the ringing application. The operation of the ring trip relay 140 closes contacts 141 to connect ground through the operating coil of the release ringing relay 130 to battery, which is thereby operated to close a holding circuit for itself through operated contacts 136 and 111. The aforementioned operation of the release ringing relay 130 also closes contacts 132 and 134 to complete the talking circuit and restore ring trip relay 140 at now open contacts 131, 133 and opens contact 137 to prevent any further operation of the ringing relay 150. At the completion of the call, the release delay relay 110 is restored and all other relays are likewise restored.

Figure 4:
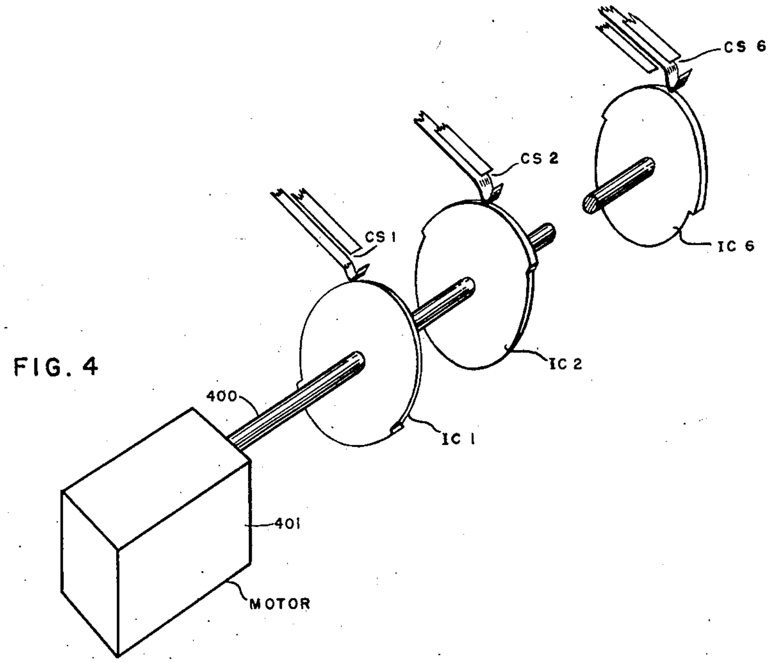
Fig. 4 is a perspective detail showing the mechanical arrangement of the interrupter cams.

Fig. 4 of the drawings is a partial perspective view of the mechanical layout of the interrupter cams showing only cams IC1, IC2, and IC6 as mounted on a cam shaft 400 to be driven by the electric motor 401. It should be understood that the cam shaft 400 is actually provided with six interrupter cams having profiles and timing arrangements such as already shown in detail and described in connection with Fig. 2 of the drawings.

Figure 3:
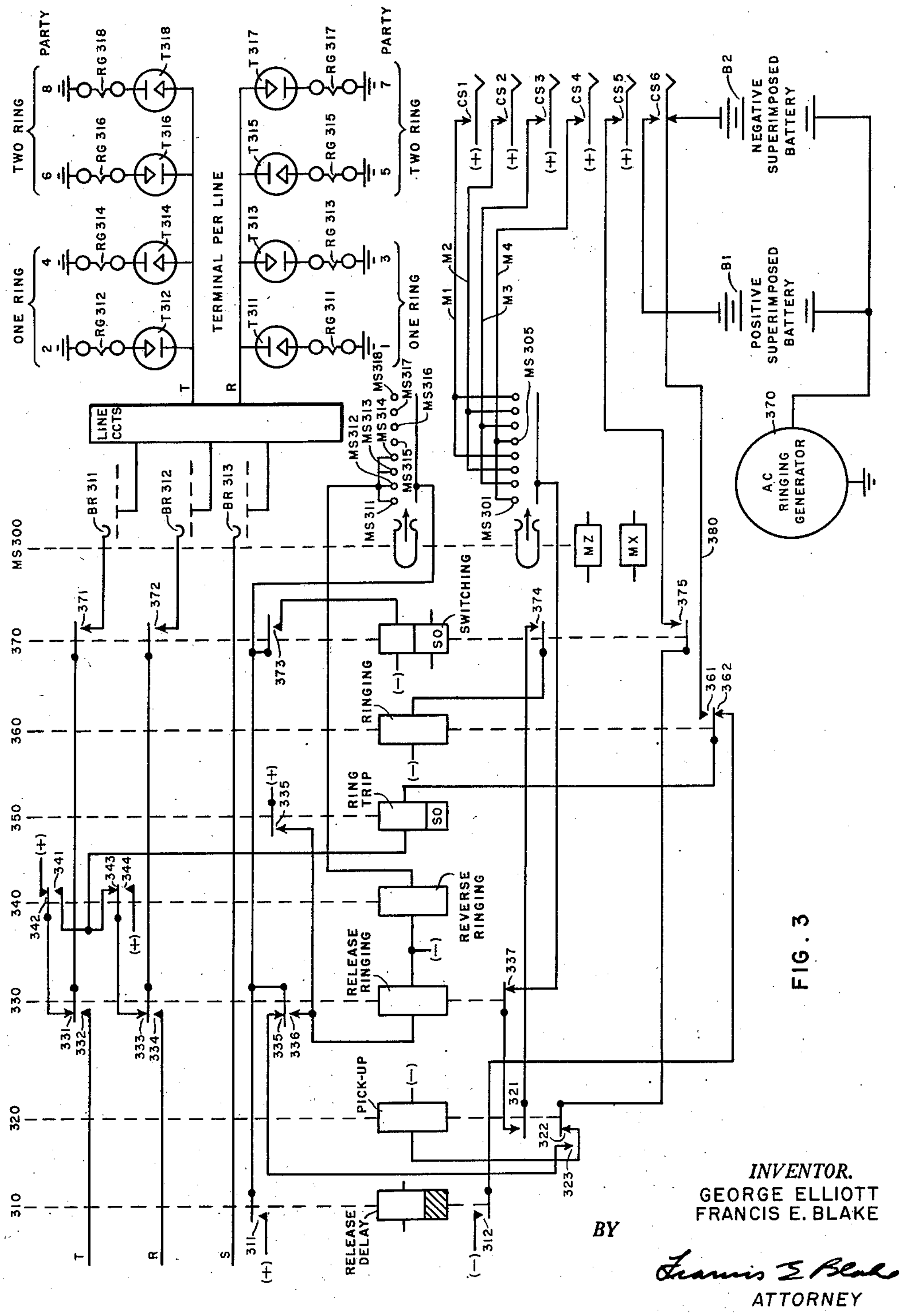
Fig. 3 is a partial schematic of a terminal per line party line connector including the ringing generator conductor and marking similar to Fig. 1.

The foregoing description has illustrated one form of the invention as particularly applied to a terminal per station party line connector. Fig. 3 of the drawings is a connector circuit somewhat similar to Fig. 1 of the drawings but modified to provide terminal per line party line connector service. The conventional arrangement of terminal per line connectors employs a minor switch MS300 having an operating magnet MX and a release magnet MZ. The operating magnet MX of the switch MS300 is operated in conventional fashion in response to the impulses of a third or ringing digit received in the connector circuit after the connector brushes BR311, BR312 and BR313 have already selected the terminals of the party line. It should be understood that the release magnet MZ of the minor switch M300 is also operated in conventional fashion upon completion of the call when the connector switch is restored to its normal unoperated position.

With the terminal per line party line service as provided by the connector circuit shown in Fig. 3 of the drawings, the ringers RG312, RG314, RG316, and RG318 are connected to the tip side of the line while the ringers RG311, RG313, RG315, and RG317 are connected to the ring side of the line. However, since this is terminal per line operation, only one set of connector terminals is provided so that the determination of the side of the line to be rung is effected by the operation of the reverse ringing relay 340, to be later described in detail. It will be noted that rectifying devices T311–T318 are connected in series with respective ones of the ringers RG311–RG318 in a similar manner to that described in Fig. 1 of the drawings for thus selecting the operation of particular ringers in accordance with the polarity of the superimposed direct current of the ringing signal.

Assuming the connector circuit to be conventionally operated, release delay relay 310 and switching relay 370 will both be operated and the minor switch MS300 will be operated to a selected one of its bank contact positions, such as contact position MS305 for the first bank of contacts, and MS315 for the second bank of contacts. The operation of the pickup relay 320 is the same as previously described for the operation of pickup relay 120, its circuit being completed through normal contacts 322, and operated contacts 375 to the interrupter cam springs CS5 and ground. Thereafter, the ringing relay 360 will be operated through operated contacts 374, 321, normal contacts 337, minor switch contact MS305, and marking lead M4 to interrupter cam spring CS4 and ground. As previously noted in connection with the form of the invention shown in Fig. 1 of the drawings, the interrupter cam spring CS4 is operated by cam IC4 to be closed twice during the second half of the ringing cycle at which time the interrupter cam spring CS6 is also operated by cam IC6 to be closed to connect the ringing generator 370 in series with a positive superimposed battery B1 to the ringing generator lead 380. The specific connection of the ringing generator signal and the ringing generator lead 380 in response to the operation of the ringing relay 360 is through operated contacts 361, the coil of the ring trip relay 350, normal contacts 343 of the reverse ringing relay 340, normal contacts 333 of the release ringing relay 330, and operated contacts 372 to the ring brush BR312 and the ring side of the party line. Therefore ringers RG311 and RG315 will be operated since they are connected in series with the positive poled rectifying devices T311 and T315 to the ring side of the line. Of course, since the ringing relay 360 has been described as being operated twice during the second half of the ringing cycle only, the party at station 5 should answer since the ringing signal has been coded for two rings.

Assuming a different ringing digit for a different called party and corresponding different operation of the minor switch MS300 to establish connection with the minor switch terminal MS301 for bank 1 and minor switch terminal MS311 for bank 2, the ringing relay 360 will still be connected through the first bank of the minor switch to the marking lead M4 and interrupter cam spring CS4. However, ground through the release delay relay contacts 311 will be connected through the second bank of the minor switch and minor switch terminal MS311 to the operating coil of the reverse ringing relay 340 and battery, thus operating the reverse ringing relay 340. Therefore the application of the ringing current on the ringing generator lead 380 through operated contacts 361 of the ringing relay 360 and the operating coil of the ring trip relay 350 will be traced through operated contacts 341 and normal contacts 331 to the operated switching relay contacts 371 and brush BR311 to the tip side of the party line. Under these conditions, ringers RG312 and RG316 will be rung with two applications of ringing current during each ringing cycle so that the party at station 6 will be selectively signaled. It will be noted that the operation of the minor switch MS300 to establish contact with any one of the minor switch terminals MS311–MS314 will provide for the operation of the reverse ringing relay 340 and therefore the connection of the ringing current to the tip side of the line. Similarly, the operation of the minor switch MS300 to any one of its terminals MS315–MS318 will cause the reverse ringing relay 340 to remain unoperated and therefore the application of the ringing current will be connected to the ring side of the line, as has been previously described in connection with the operation of the minor switch to terminals MS305.

In order to briefly describe the remainder of the operations of the connector circuit shown in Fig. 3 of the drawings, it should be pointed out that a holding circuit for the switching relay 370 is established through operated contacts 373 to the ground through operated contacts 311 of the release delay relay 310. The ringing is tripped upon the answer of the party on the line by closure of the loop circuit across the line to connect ground through either normal contacts 342 or operated contacts 344 of the reverse ringing relay 340 to a respective side of the line and through operated contacts 371, brush BR311, brush BR312, operated contacts 372, coil of the ring trip relay 350, normal contacts 362 and operated contacts 312 to battery. The operation of the ring trip relay 350 connects ground through operated contacts 335 to the coil of the release ringing relay 330 and battery, thus operating the release ringing relay 330 to open contacts 335 for restoring the pickup relay 320 and close contacts 336 to establish a holding circuit for the release ringing relay 330. With the pickup relay 320 restored, the operating circuit for the ringing relay 360 is opened by the then normal contacts 321 and the operating circuit is also opened at the operated contacts 337 of the release ringing relay 330. In addition, the operation of the release ringing relay 330 opens contacts 331 and 333 and closes contacts 332 and 334 to establish a talking circuit and release the ring trip relay 350. Thereafter upon completion of the call, the release delay relay 310 is restored and the remainder of the operated relays in the circuit are restored as the connector switch returns to normal position, all as is conventional in the art.

It will be noted that the terminal per station arrangement of the invention described in connection with Fig. 1 of the drawings provides that the directive operation of the extra control brush BR114 determines the character of the ringing signal to be connected by the operation of the ringing relay 150 to one conductor of the party line. Similarly, the operation of the connector brushes BR111 and BR112 to the selected set of terminals including the tip and ring terminals for the brushes BR113 and BR114 determines the side of the line to which the ringing signal is applied since the different stations on the line are connected to different sets of connector terminals with the connections for certain stations reversed as to the tip and ring conductors of the party line. Thus in a sense, the directive operation of the connector switch brushes BR111–BR114 is in effect a ringing mode selecting switch. In the terminal per line operation of the invention, as shown in Fig. 3 of the drawings, the directive operation of the minor switch MS300 determines both the character of the ringing current to be applied to the party line and the particular side of the line to which the ringing current is applied. Thus in this form of the invention, the minor switch MS300 may be termed a ringing mode selecting switch. A particular advantage of this arrangement as provided for either terminal per station or terminal per line connector service is that the same ringing generator source with positive and negative superimposed battery and interrupter cam springs CS1–CS6 may be used to service an exchange having either terminal per line or terminal per station connector switches.

Various modifications may be made within the spirit of the invention and the scope of the appended claims.

What is claimed is:

1. In a dial telephone system, a terminal per station party line connector having a plurality of different groups of connector terminals including at least tip, ring, and control conductor terminals in each group of connector terminals, a party line, means connecting the tip and ring terminals of a plurality of different groups of connector terminals in parallel to said party line, a ringing generator conductor, a source of ringing current, a source of positive direct current, a source of negative direct current, means for alternately and sequentially connecting said positive direct current source and said negative direct current source, respectively, in series with said source of ringing current and ground to said ringing generator conductor, ringing means to be operated for connecting said ringing generator conductor to a selected one of said tip and ring terminals, and means responsive to the operation of said connector to connect with a selected one of said control conductor terminals for operating and releasing said ringing means only during connection of said ringing current and a predetermined one of said sources of direct current to said ringing generator conductor.

2. In a dial telephone system, a terminal per station party line connector having a plurality of different groups of connector terminals including at least tip, ring, and control conductor terminals in each group of connector terminals, a party line, means connecting the tip and ring terminals of a plurality of different groups of connector terminals in parallel to said party line, a source of ringing current, a ringing generator conductor, a source of positive direct current, a source of negative direct current, means for alternately and sequentially connecting said positive direct current source and said negative direct current source, respectively, in series with said source of ringing current and ground to said ringing generator conductor, ringing means to be operated for connecting said ringing generator conductor to a selected one of said tip and ring terminals, and means responsive to the operation of said connector to connect with a selected one of said control conductor terminals for operating and releasing said ringing means once only during each successive connection of said ringing current and a predetermined one of said sources of direct current to said ringing generator conductor.

3. In a dial telephone system, a terminal per station party line connector having a plurality of different groups of connector terminals including at least tip, ring, and control conductor terminals in each group of connector terminals, a party line, means connecting the tip and ring terminals of a plurality of different groups of connector terminals in parallel to said party line, a ringing generator conductor, a source of ringing current, a source of positive direct current, a source of negative direct current, means for alternately and sequentially connecting said positive direct current source and said negative direct current source, respectively, in series with said source of ringing current and ground to said ringing generator conductor, ringing means to be operated for connecting said ringing generator conductor to a selected one of said tip and ring terminals, and means responsive to the operation of said connector to connect with a selected one of said control conductor terminals for operating and releasing said ringing means twice only during each connection of said ringing current and predetermined one of said sources of direct current to said ringing generator conductor.

4. In a dial telephone system, a terminal per station party line connector having a plurality of different groups of connector terminals including at least tip, ring, and control conductor terminals in each group of connector terminals, a party line, means connecting the tip and ring terminals of a plurality of different groups of connector terminals in parallel to said party line, a ringing generator conductor, a source of ringing current, a source of direct current, means for alternately and sequentially connecting said source of direct current with first one polarity and then the other polarity, respectively, in series with said source of ringing current and ground to said ringing generator conductor, ringing means to be operated for connecting said ringing generator conductor to one of said tip and ring terminals, and means responsive to the operation of said connector to connect with a selected one of said control conductor terminals for operating and releasing said ringing means only during connection of said ringing current and said source of direct current with a predetermined one of said polarities to said ringing generator conductor.

5. In a dial telephone system, a terminal per station party line connector having a plurality of different groups of connector terminals including at least tip, ring, and control conductor terminals in each group of connector terminals, a party line, means connecting the tip and ring terminals of a plurality of different groups of connector terminals in parallel to said party line, a ringing generator conductor, a source of ringing current, a source of direct current, means for alternately and sequentially connecting said source of direct current with first one polarity and then the other polarity, respectively, in series with said source of ringing current and ground to said ringing generator conductor, ringing means to be operated for connecting said ringing generator conductor to one of said tip and ring terminals, and means responsive to the operation of said connector to connect with a selected one of said control conductor terminals for operating and releasing said ringing means once only during each successive connection of said ringing current and said source of direct current with a predetermined one of said polarities to said ringing generator conductor.

6. In a dial telephone system, a terminal per station party line connector having a plurality of different groups of connector terminals including at least tip, ring, and control conductor terminals in each group of connector terminals, a party line, means connecting the tip and ring terminals of a plurality of different groups of connector terminals in parallel to said party line, a ringing generator conductor, a source of ringing current, a source of direct current, means for alternately and sequentially connecting said source of direct current with first one polarity and then the other polarity, respectively, in series with said source of ringing current and ground to said ringing generator conductor, ringing means to be operated for connecting said ringing generator conductor to one of said tip and ring terminals, and means responsive to the operation of said connector to connect with a selected one of said control conductor terminals for operating and releasing said ringing means twice only during each successive connection of said ringing current and said source of direct current with a predetermined one of said polarities to said ringing generator conductor.

7. In a dial telephone system, a terminal per station party line connector having a plurality of different groups of connector terminals including at least tip, ring, and control conductor terminals in each group of connector terminals, a party line, means connecting the tip and ring terminals of a plurality of different groups of connector terminals in parallel to said party line, a ringing generator conductor, a source of ringing current, a first source of positive direct current, a second source of negative direct current, means for alternately and sequentially connecting said positive direct current source and said negative direct current source, respectively, in series with said source of ringing current and ground to said ringing generator conductor, ringing means to be operated for connecting said ringing generator conductor to one of said tip and ring terminals, means responsive to the operation of said connector to connect with a first selected one of said control conductor terminals for operating and releasing said ringing means once only during each connection of said ringing current and a predetermined one of said sources of direct current to said ringing generator conductor, and means responsive to the operation of said connector to connect with a second selected one of said control conductor terminals for operating and releasing said ringing means twice only during each connection of said ringing current and the predetermined one of said sources of direct current to said ringing generator conductor.

8. In a dial telephone system, a terminal per station party line connector having a plurality of different groups of connector terminals including at least tip, ring, and control conductor terminals in each group of connector terminals, a party line, means connecting the tip and ring terminals of a plurality of different groups of connector terminals in parallel to said party line, a ringing generator conductor, a source of ringing current, a source of direct current, means for alternately and sequentially connecting said source of direct current with first one polarity and then the other polarity, respectively, in series with said source of ringing current and ground to said ringing generator conductor, ringing means to be operated for connecting said ringing generator conductor to one of said tip and ring terminals, means responsive to the operation of said connector to connect with a first selected one of said control conductor terminals for operating and releasing said ringing means once only during connection of said ringing current and said source of direct current with a predetermined one of said polarities to said ringing generator conductor, and means responsive to the operation of said connector to connect with a second selected one of said control conductor terminals for operating and releasing said ringing means twice only during each connection of said ringing conductor and said source of direct current with a predetermined one of said polarities to said ringing generator conductor.

9. In a dial telephone system, a party line connector including a connector switch having tip and ring brushes to be operated to connect with selected tip and ring connector terminals, a party line connected to respective tip and ring terminals, ringing mode selecting means, means to operate said mode selecting means in a characteristic manner in response to the characterizing impulses of the party station directory number, a ringing generator conductor, a source of ringing current, a source of direct current, means for alternately and sequentially connecting said source of direct current with first one polarity and then the other polarity respectively in series with said source of ringing current and ground to said ringing generator conductor, and ringing means to be operated for connecting said ringing generator conductor to a selected one of said tip and ring brushes, the characteristic manner of operation of said ringing mode selecting means being effective to control the operation of said ringing means to be operated and released only during connection of said ringing current and said source of direct current with a predetermined one of said polarities to said ringing generator conductor.

10. In a dial telephone system, a party line connector including a connector switch having tip and ring brushes to be operated to connect with selected tip and ring connector terminals, a party line connected to respective tip and ring terminals, ringing mode selecting means, means to operate said mode selecting means in a characteristic manner in response to the characterizing impulses of the party station directory number, a ringing generator conductor, a source of ringing current, a source of direct current, means for alternately and sequentially connecting said source of direct current with first one polarity and then the other polarity respectively in series with said source of ringing current and ground to said ringing generator conductor, and ringing means to be operated for connecting said ringing generator conductor to a selected one of said tip and ring brushes, the characteristic manner of operation of said ringing mode selecting means being effective to control the operation of said ringing means to be operated and released once only during each successive connection of said ringing current and said source of direct current with a predetermined one of said polarities to said ringing generator conductor.

11. In a dial telephone system, a party line connector including a connector switch having tip and ring brushes to be operated to connect with selected tip and ring connector terminals, a party line connected to respective tip and ring terminals, ringing mode selecting means, means to operate said mode selecting means in a characteristic manner in response to the characterizing impulses of the party station directory number, a ringing generator conductor, a source of ringing current, a source of direct current, means for alternately and sequentially connecting said source of direct current with first one polarity and then the other polarity respectively in series with said source of ringing current and ground to said ringing generator conductor, and ringing means to be operated for connecting said ringing generator conductor to a selected one of said tip and ring brushes, the characteristic manner of operation of said ringing mode selecting means being effective to control the operation of said ringing means to be operated and released twice only during each successive connection of said ringing current and said source of direct current to said ringing generator conductor.

12. In a dial telephone system, a party line connector including a connector switch having tip and ring brushes to be operated to connect with selected tip and ring connector terminals, a party line connected to respective tip and ring terminals, a ringing mode selecting switch operable to selected positions in accordance with the number of ringing digit impulses, a ringing generator conductor, a source of ringing current, a source of direct current, means for alternately and sequentially connecting said source of direct current with first one polarity and then the other polarity respectively in series with said source of ringing current and ground to said ringing generator conductor, ringing means to be operated for connecting said ringing generator conductor to a selected one of said tip and ring brushes, and means responsive to the selected position of said ringing mode switch for operating and releasing said ringing means only during connection of said ringing current and said source of direct current with a predetermined one of said polarities to said ringing generator conductor.

13. In a dial telephone system, a party line connector including a connector switch having tip and ring brushes to be operated to connect with selected tip and ring connector terminals, a party line connected to respective tip and ring terminals, a ringing mode selecting switch operable to selected positions in accordance with the number of ringing digit impulses, a ringing generator conductor, a source of ringing current, a source of direct current, means for alternately and sequentially connecting said source of direct current with first one polarity and then the other polarity respectively in series with said source of ringing current and ground to said ringing generator conductor, ringing means to be operated for connecting said ringing generator conductor to a selected one of said tip and ring brushes, and means responsive to the selected position of said ringing mode switch for operating and releasing said ringing means once only during each successive connection of said ringing current and said source of direct current with a predetermined one of said polarities to said ringing generator conductor.

14. In a dial telephone system, a party line connector including a connector switch having tip and ring brushes to be operated to connect with selected tip and ring connector terminals, a party line connected to respective tip and ring terminals, a ringing mode selecting switch operable to selected positions in accordance with the number of ringing digit impulses, a ringing generator conductor, a source of ringing current, a source of direct current, means for alternately and sequentially connecting said source of direct current with first one polarity and then the other polarity respectively in series with said source of ringing current and ground to said ringing generator conductor, ringing means to be operated for connecting said ringing generator conductor to a selected one of said tip and ring brushes, and means responsive to the selected position of said ringing mode switch for operating and releasing said ringing means twice only during each successive connection of said ringing current and said source of direct current with a predetermined one of said polarities to said ringing generator conductor.

15. In a dial telephone system, a party line connector including a connector switch having tip and ring brushes to be operated to connect with selected tip and ring connector terminals, a party line connected to respective tip and ring terminals, ringing mode selecting means, means to operate said mode selecting means in a characteristic manner in response to the characterizing impulses of the party station directory number, a ringing generator conductor, a source of ringing current, a source of direct current, means for alternately and sequentially connecting said source of direct current with first one polarity and then the other polarity respectively in series with said source of ringing current and ground to said ringing generator conductor, ringing means to be operated for connecting said ringing generator conductor through a selected one of said tip and ring brushes to a selected one of said tip and ring terminals, the characteristic manner of operation of said ringing mode selecting means being effective to control the operation of said ringing means to be operated and released only during connection of said ringing current and said source of direct current with a predetermined one of said polarities to said ringing generator conductor and to also select the tip or ring terminal to which said ringing generator conductor is connected.

16. In a dial telephone system, a party line connector including a connector switch having tip and ring brushes to be operated to connect with selected tip and ring connector terminals, a party line connected to respective tip and ring terminals, ringing mode selecting means, means to operate said mode selecting means in a characteristic manner in response to the characterizing impulses of the party station directory number, a ringing generator conductor, a source of ringing current, a source of direct current, means for alternately and sequentially connecting said source of direct current with first one polarity and then the other polarity respectively in series with said source of ringing current and ground to said ringing generator conductor, ringing means to be operated for connecting said ringing generator conductor through a selected one of said tip and ring brushes to a selected one of said tip and ring terminals, the characteristic manner of operation of said ringing mode selecting means being effective to control the operation of said ringing means to be operated and released once only during each successive connection of said ringing current and said source of direct current with a predetermined one of said polarities to said ringing generator conductor and to also select the tip or ring terminal to which said ringing generator conductor is connected.

17. In a dial telephone system, a party line connector including a connector switch having tip and ring brushes to be operated to connect with selected tip and ring connector terminals, a party line connected to respective tip and ring terminals, ringing mode selecting means, means to operate said mode selecting means in a characteristic manner in response to the characterizing impulses of the party station directory number, a ringing generator conductor, a source of ringing current, a source of direct current, means for alternately and sequentially connecting said source of direct current with first one polarity and then the other polarity respectively in series with said source of ringing current and ground to said ringing generator conductor, ringing means to be operated for connecting said ringing generator conductor through a selected one of said tip and ring brushes to a selected one of said tip and ring terminals, the characteristic manner of operation of said ringing mode selecting means being effective to control the operation of said ringing means to be operated and released twice only during each successive connection of said ringing current and said source of direct current with a predetermined one of said polarities to said ringing generator conductor and to also select the tip or ring terminal to which said ringing generator conductor is connected.

18. In a dial telephone system, a party line connector including a connector switch having tip and ring brushes to be operated to connect with selected tip and ring connector terminals, a party line connected to respective tip and ring terminals, a ringing mode selecting switch operable to selected positions in accordance with the number of ringing digit impulses, a ringing generator conductor, a source of ringing current, a source of direct current, means for alternately and sequentially connecting said source of direct current with first one polarity and then the other polarity respectively in series with said source of ringing current and ground to said ringing generator conductor, ringing means to be operated for connecting said ringing generator conductor to a selected one of said tip and ring brushes, means responsive to the selected position of said ringing mode switch for operating and releasing said ringing means only during connection of said ringing current and said source of direct current with a predetermined one of said polarities to said ringing generator conductor, and means also responsive to the selected position of said ringing mode switch for selecting the tip or ring brush to which said ringing generator conductor is connected.

19. In a dial telephone system, a party line connector including a connector switch having tip and ring brushes to be operated to connect with selected tip and ring connector terminals, a party line connected to respective tip and ring terminals, a ringing mode selecting switch operable to selected positions in accordance with the number of ringing digit impulses, a ringing generator conductor, a source of ringing current, a source of direct current, means for alternately and sequentially connecting said source of direct current with first one polarity and then the other polarity respectively in series with said source of ringing current and ground to said ringing generator conductor, ringing means to be operated for connecting said ringing generator conductor to a selected one of said tip and ring brushes, means responsive to the selected position of said ringing mode switch for operating and releasing said ringing means once only during each successive connection of said ringing current and said source of direct current with a predetermined one of said polarities to said ringing generator conductor, and means also responsive to the selected position of said ringing mode switch for selecting the tip or ring brush to which said ringing generator conductor is connected.

20. In a dial telephone system, a party line connector including a connector switch having tip and ring brushes to be operated to connect with selected tip and ring connector terminals, a party line connected to respective tip and ring terminals, a ringing mode selecting switch operable to selected positions in accordance with the number of ringing digit impulses, a ringing generator conductor, a source of ringing current, a source of direct current, means for alternately and sequentially connecting said source of direct current with first one polarity and then the other polarity respectively in series with said source of ringing current and ground to said ringing generator conductor, ringing means to be operated for connecting said ringing generator conductor to a selected one of said tip and ring brushes, means responsive to the selected position of said ringing mode switch for operating and releasing said ringing means twice only during each successive connection of said ringing current and said source of direct current with a predetermined one of said polarities to said ringing generator conductor, and means also responsive to the selected position of said ringing mode switch for selecting the tip or ring brush to which said ringing generator conductor is connected.

References Cited in the file of this patent

UNITED STATES PATENTS

| | | |
|---|---|---|
| 2,490,054 | Hatton | Dec. 6, 1949 |
| 2,532,125 | Singers | Nov. 28, 1950 |

FOREIGN PATENTS

| | | |
|---|---|---|
| 434,446 | Great Britain | Sept. 2, 1935 |
| 828,722 | Germany | Jan. 21, 1952 |